US012506291B2

(12) United States Patent
Kobayashi et al.

(10) Patent No.: US 12,506,291 B2
(45) Date of Patent: Dec. 23, 2025

(54) CONNECTOR

(71) Applicant: JAPAN AVIATION ELECTRONICS INDUSTRY, LIMITED, Tokyo (JP)

(72) Inventors: Atsushi Kobayashi, Tokyo (JP); Toshiro Kobuchi, Tokyo (JP); Takayuki Nishimura, Tokyo (JP); Takuya Takahashi, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 320 days.

(21) Appl. No.: 18/374,874

(22) Filed: Sep. 29, 2023

(65) Prior Publication Data

US 2024/0154344 A1 May 9, 2024

(30) Foreign Application Priority Data

Nov. 4, 2022 (JP) ................................ 2022-177060

(51) Int. Cl.
*H01R 12/71* (2011.01)
*H01R 13/424* (2006.01)

(52) U.S. Cl.
CPC ......... *H01R 13/424* (2013.01); *H01R 12/716* (2013.01)

(58) Field of Classification Search
CPC .... H01R 13/424; H01R 12/716; H01R 12/57; H01R 12/707; H01R 13/405; H01R 12/73;

(Continued)

(56) References Cited

U.S. PATENT DOCUMENTS 9,362,637 B2 6/2016 Hasegawa
2013/0280926 A1* 10/2013 Ono .................. H01R 12/7052 439/65

(Continued)

FOREIGN PATENT DOCUMENTS

JP 2017-168210 A 9/2017
KR 10-2016-0014521 2/2016
KR 10-2041368 10/2019

OTHER PUBLICATIONS

Office Action issued in Corresponding KR Patent Application No. 10-2023-0128039, dated Feb. 20, 2025, along with an English translation thereof.

*Primary Examiner* — Abdullah A Riyami
*Assistant Examiner* — Nelson R. Burgos-Guntin
(74) *Attorney, Agent, or Firm* — Greenblum & Bernstein, P.L.C.

(57) ABSTRACT

A connector includes a housing, two reinforcing brackets that are incorporated in both respective end portions in a longitudinal direction of the housing, and terminals that are arranged on and held by the housing between the two reinforcing brackets. The housing includes an island-shaped portion, a peripheral wall, and an accommodating concave portion that is formed between the peripheral wall and the island-shaped portion so as to accommodate a fitting portion of a mating connector. Each of the reinforcing brackets includes a protection portion, a guide portion, and a spring strip. The spring strip is formed in a cantilever shape, and the spring strip is positioned on an inner side compared to the protection portion in the longitudinal direction of the housing. A concave portion that allows elastic deformation of the spring strip is formed on a side surface of the island-shaped portion.

4 Claims, 10 Drawing Sheets

(58) Field of Classification Search
CPC .. H01R 13/426; H01R 13/434; H01R 13/516; H01R 12/7017; H01R 13/24
See application file for complete search history.

(56) References Cited

U.S. PATENT DOCUMENTS

| | | | | |
|---|---|---|---|---|
| 2017/0264048 | A1* | 9/2017 | Ashibu | H01R 13/631 |
| 2019/0165513 | A1* | 5/2019 | Tanaka | H01R 13/6275 |
| 2019/0363467 | A1 | 11/2019 | Ko et al. | |
| 2020/0127400 | A1* | 4/2020 | Sasayama | H01R 4/02 |
| 2020/0343659 | A1* | 10/2020 | Gondo | H01R 24/00 |
| 2020/0343660 | A1* | 10/2020 | Gondo | H01R 12/57 |
| 2020/0358213 | A1* | 11/2020 | Tanaka | H01R 12/73 |
| 2021/0143567 | A1* | 5/2021 | Someya | H01R 13/504 |

* cited by examiner

CONNECTOR

TECHNICAL FIELD

The present invention relates to a connector that is used in a manner to be mounted on a board as, for example, a board-to-board connector.

BACKGROUND ART

FIG. 1 illustrates a connector described in Japanese Patent Application Laid Open No. 2017-168210 as a conventional example of this type of connector. A connector 10 includes a holding member 20 made of resin, a plurality of contacts 30 held by the holding member 20, two reinforcing members 40 incorporated in the holding member 20, and two guide members 50. The reinforcing member 40 and the guide member 50 are made of metal and are integrally formed (one component) as illustrated in FIG. 2.

The holding member 20 has an accommodating portion 21, an island-shaped portion 22, and a surrounding portion 23. The accommodating portion 21 accommodates part of a mating connector when the mating connector is fitted to the connector 10. The island-shaped portion 22 is arranged inside the accommodating portion 21 and protrudes upward. The surrounding portion 23 has first opposing wall portions 24 and second opposing wall portions 25, forming a substantially rectangular shape and surrounding the accommodating portion 21.

On each of the both ends of the island-shaped portion 22, three first contact portion accommodating portions 26 are formed. On each of the first opposing wall portions 24, two concave portions 27 and three second contact portion accommodating portions 28 are formed and the second contact portion accommodating portions 28 are arranged between the two concave portions 27.

The contact 30 has first contact portions 31 and second contact portions 32 that are mutually coupled and opposed. The first contact portion 31 is accommodated in the first contact portion accommodating portion 26 of the island-shaped portion 22 and the second contact portion 32 is accommodated in the second contact portion accommodating portion 28 on the first opposing wall portion 24 of the surrounding portion 23.

The respective reinforcing members 40 are positioned on both end portions, in a longitudinal direction, of the island-shaped portion 22. The reinforcing member 40 has a protection portion 41 and two elastic strips 42. The protection portion 41 protects an end portion of the island-shaped portion 22, and the elastic strips 42 extend from the protection portion 41 to respective first opposing wall portions 24. The elastic strips 42 are brought into contact with a mating connector in fitting between the connector 10 and the mating connector. The elastic strips 42 are accommodated in respective concave portions 27 of the first opposing wall portions 24 and deformation thereof is allowed by the concave portions 27.

The guide member 50 includes a first guide portion 51, two second guide portions 52, a fixed portion 53, and a coupling portion 54. The guide members 50 and the reinforcing members 40 are incorporated in the holding member 20 by insert molding as illustrated in FIG. 1(*a*).

Even though a position of a fitting end of a mating connector is displaced with respect to the accommodating portion 21 of the holding member 20 when the connector 10 is fitted to the mating connector, the guide members 50 guide the fitting end to the accommodating portion 21. Further, the both end portions of the island-shaped portion 22 are protected by the protection portions 41 of the reinforcing member 40. Therefore, even though the mating connector is fitted to the connector 10 in such a displaced state, a damage of the island-shaped portion 22 can be avoided.

SUMMARY OF THE INVENTION

As described above, in the connector 10 of related art, the two elastic strips 42 included in the reinforcing member 40 are positioned and allowed to deform in respective concave portions 27 that are formed along the entire length in a vertical direction (height direction) of the first opposing wall portions 24 of the holding member 20, as illustrated in FIG. 1(*b*). However, such formation of the concave portions 27 reduces the thickness of the first opposing wall portions 24 and accordingly, the strength of the holding member 20 is degraded due to the presence of the concave portions 27.

Especially, when the elastic strips 42 to be brought into contact with a mating connector are used as power supply terminals, cross-sectional areas of the elastic strips 42 are required to be increased in a manner such that the width of the elastic strip 42 is set larger than the width of the second contact portion 32 of the contact 30 for signals, so as to increase current capacity. However, the size of the concave portion 27 of the first opposing wall portion 24 is also increased along with the increase in the width of the elastic strip 42, further degrading the strength of the holding member 20.

An object of the present invention is to provide a connector that does not degrade strength of a housing which holds terminals, unlike the related art example, even when, for example, a width of a spring strip, which is included in a reinforcing bracket incorporated in the housing, is increased so as to increase a cross-sectional area of the spring strip and use the spring strip as a power supply terminal.

According to an embodiment of the present invention, a connector includes a housing that is made of resin, two reinforcing brackets that are incorporated in both respective end portions in a longitudinal direction of the housing, and terminals that are arranged on and held by the housing between the two reinforcing brackets. The housing includes an island-shaped portion that extends in the longitudinal direction, a peripheral wall that surrounds the island-shaped portion, and an accommodating concave portion that is formed between the peripheral wall and the island-shaped portion so as to accommodate a fitting portion of a mating connector. The terminals are positioned along a side surface in the longitudinal direction of the island-shaped portion, in the accommodating concave portion. Each of the reinforcing brackets includes a protection portion covering an end portion of the island-shaped portion, a guide portion covering an end portion of the peripheral wall, and a spring strip. The spring strip is formed in a cantilever shape that is extended from the guide portion to pass through the accommodating concave portion and reach the island-shaped portion, and the spring strip is positioned on an inner side compared to the protection portion in the longitudinal direction of the housing. A concave portion that allows elastic deformation of the spring strip, which is brought into contact with the mating connector and elastically deforms, is formed on the side surface of the island-shaped portion.

Effects of the Invention

According to the connector of an embodiment of the present invention, the concave portion that allows elastic deformation of the spring strip of the reinforcing bracket is formed in the island-shaped portion surrounded by the peripheral wall of the housing and accordingly does not degrade strength of the housing. Thus, even though the size of the spring strip is increased to use the spring strip as a power supply terminal and the size of the concave portion is increased along with the increase of the size of the spring strip, the strength of the housing is not degraded.

BRIEF DESCRIPTION OF THE DRAWINGS

FIG. 5(*b*) is a sectional view taken along a B-B line of FIG. 4.

DETAILED DESCRIPTION OF THE EMBODIMENTS

Figure 1A:
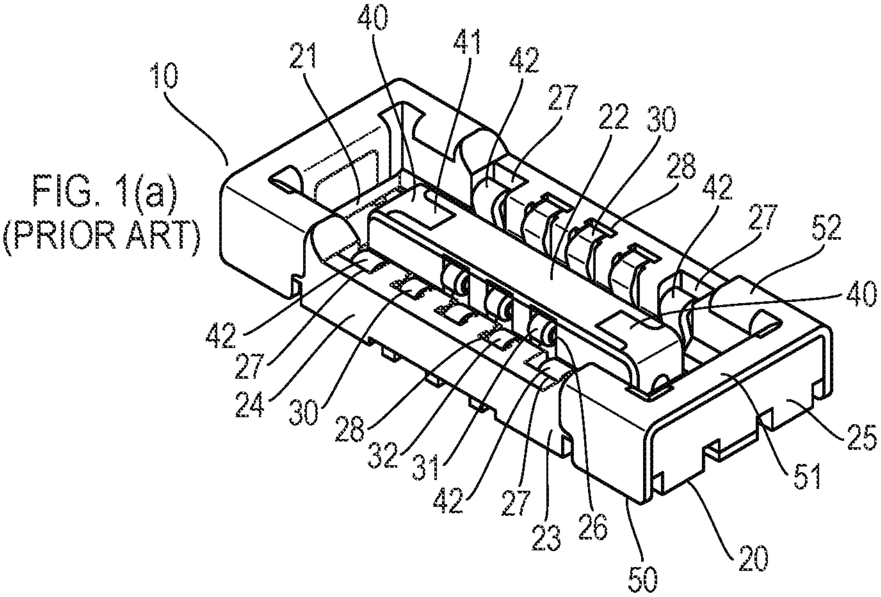
FIG. 1(a) (PRIOR ART)
FIG. 1(*a*) is a perspective view illustrating a connector of related art and FIG. 1(*b*) is a sectional view thereof.
Figure 1B:
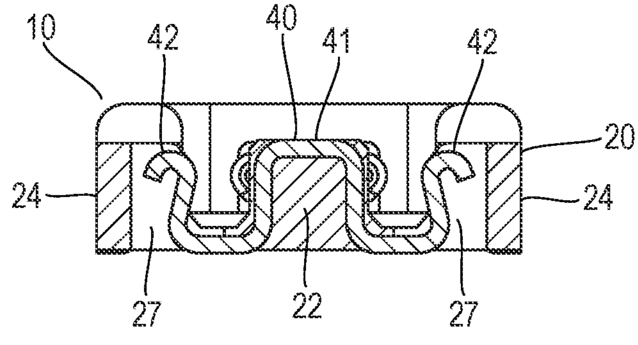
FIG. 1(b) (PRIOR ART)
Figure 2:
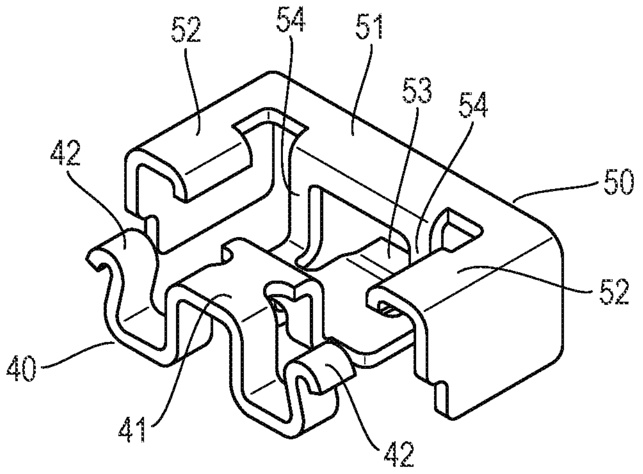
FIG. 2 (PRIOR ART)
FIG. 2 is a perspective view illustrating a reinforcing member integrated with a guide member of FIG. 1.
Figure 3:
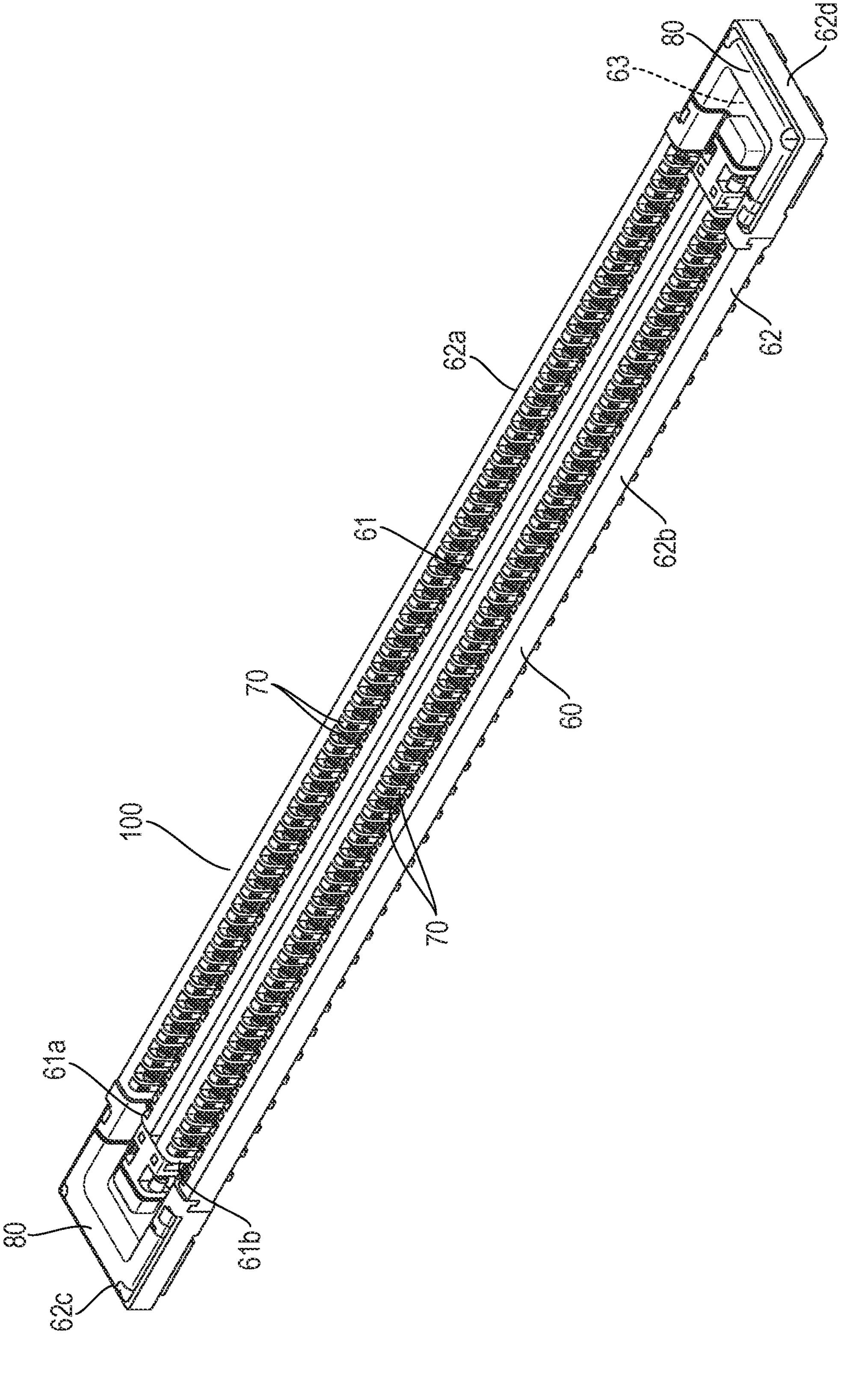
FIG. 3 is a perspective view illustrating an example of a connector according to the present invention.

An embodiment of the present invention will be described based on an example with reference to the accompanying drawings.

FIGS. 3 to 6 illustrate one example of a connector according to the present invention. This connector 100 includes a housing 60 made of resin, a large number of terminals 70, and two reinforcing brackets 80.

The housing 60 has a long and flat shape, and includes an island-shaped portion 61 extending in a longitudinal direction and a peripheral wall 62 surrounding the island-shaped portion 61. The peripheral wall 62 has a rectangular frame shape, and an accommodating concave portion 63 for accommodating a fitting portion of a mating connector is formed between the peripheral wall 62 and the island-shaped portion 61.

The terminals 70 and the reinforcing brackets 80 are incorporated in the housing 60 by insert molding in this example. The terminals 70 are on positions, along each of side surfaces 61*a* and 61*b* in the longitudinal direction of the island-shaped portion 61, in the accommodating concave portion 63 and arranged along the longitudinal direction of the island-shaped portion 61 between the two reinforcing brackets 80 in a manner to be held by the housing 60.

The terminals 70 are staggered in this example. When the arrangement of the terminals 70 is counted from left to right in FIG. 4 as the first row, the second row, . . . , a cross section of the connector 100 on a portion on which the terminals 70 in an odd-numbered row are located and a cross section of the connector 100 on a portion on which the terminals 70 in an even-numbered row are located are shown in FIG. 6(*a*) and FIG. 6(*b*) respectively.

Figure 6A:
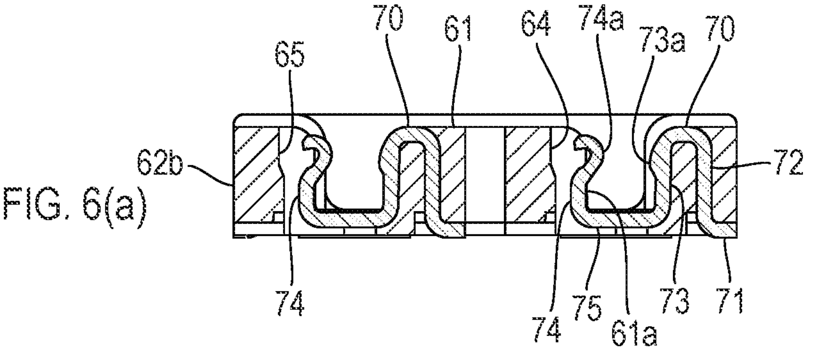
FIG. 6(*a*) is a sectional view taken along a C-C line of FIG. 4, FIG. 6(*b*) is a sectional view taken along a D-D line of FIG. 4, and FIG. 6(*c*) is a sectional view taken along an E-E line of FIG. 4.
Figure 6B:
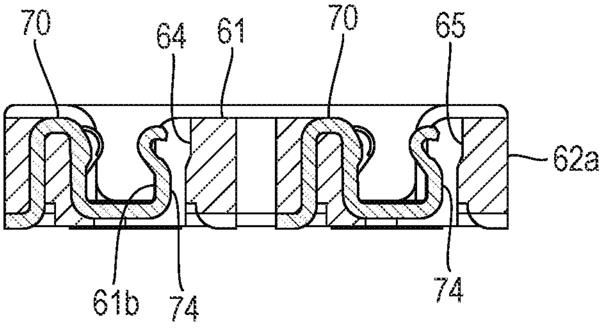
Figure 6C:
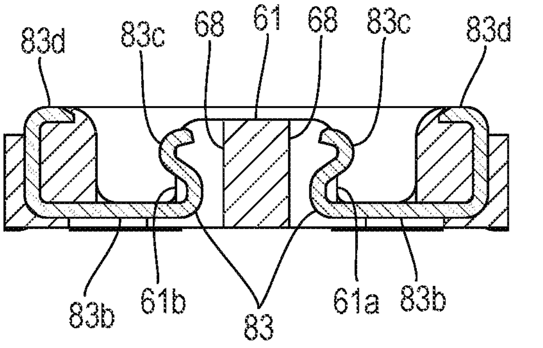

The shape of a single terminal 70 is the same in both FIGS. 6(*a*) and 6(*b*). The terminal 70 includes a connection portion 71, a standing portion 72, a first contact portion 73, a second contact portion 74, and a coupling portion 75. The connection portion 71 is positioned on a bottom surface side of the housing 60 so as to be connected to a board by soldering. The standing portion 72 is raised from the connection portion 71. The first contact portion 73 is bent back from the standing portion 72. The second contact portion 74 is opposed to the first contact portion 73. The coupling portion 75 couples lower ends of the first contact portion 73 and the second contact portion 74 to each other. A free end of the second contact portion 74 is bent to be closer to the first contact portion 73 in a semi-circular arc shape, thus forming a bent portion 74*a*. A protrusion portion 73*a* is formed in a protruding manner on the first contact portion 73 so that the protrusion portion 73*a* is opposed to the bent portion 74*a*.

Figure 4:
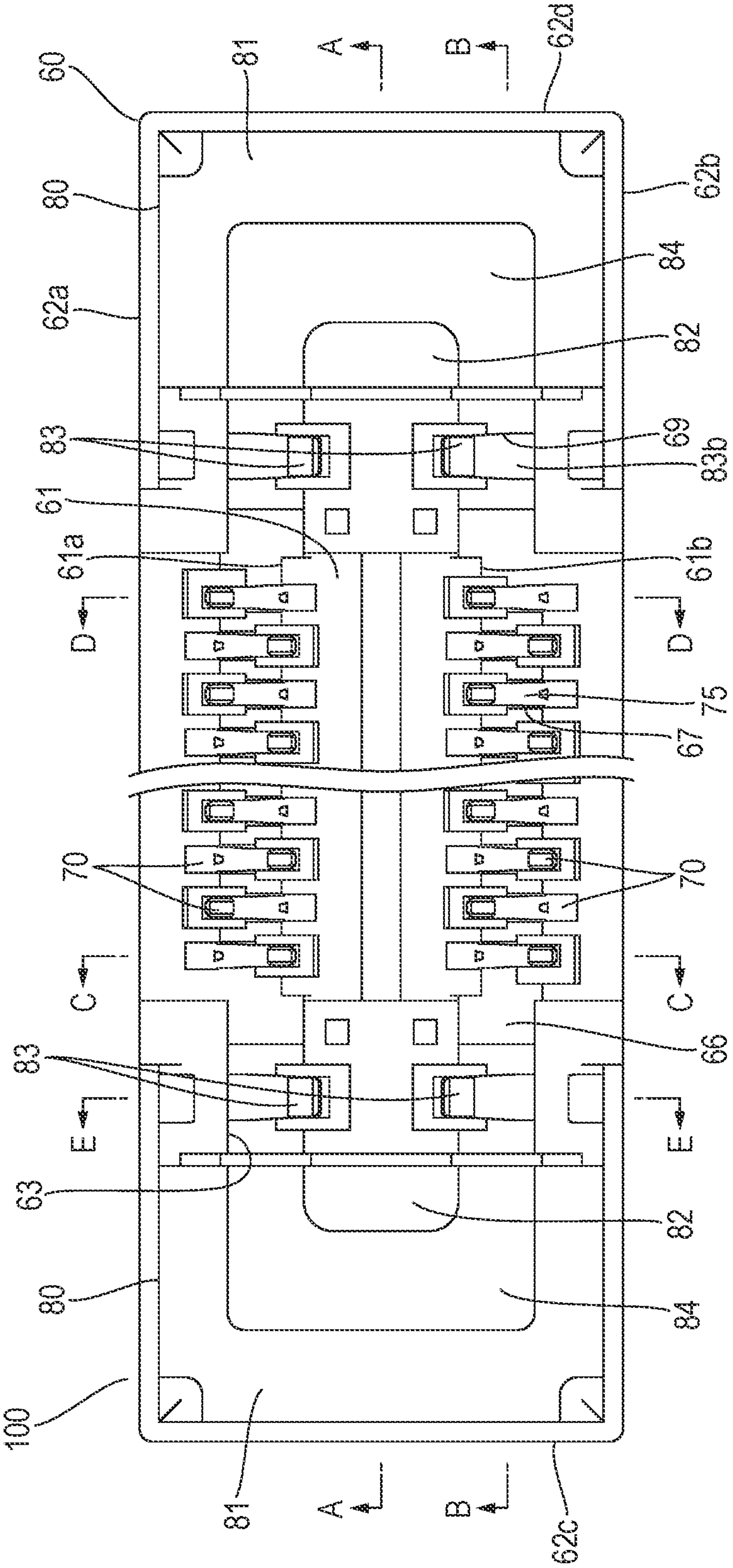
FIG. 4 is an enlarged plan view illustrating the connector of FIG. 3 except for an intermediate portion.

Here, in the peripheral wall 62 having the rectangular frame shape, portions positioned on a pair of long sides of the rectangle are referred to as side walls 62*a* and 62*b* and portions positioned on a pair of short sides are referred to as end walls 62*c* and 62*d*. In the portion in which the terminals 70 on an odd-numbered row are located, concave portions 64 and 65 are formed at the side surface 61*a* of the island-shaped portion 61 and an inner surface of the side wall 62*b* respectively, and these concave portions 64 and 65 allow elastic deformation of respective second contact portions 74 of the terminals 70. Further, in the portion in which the terminals 70 on an even-numbered row are located, the concave portions 64 and 65 are formed at the side surface 61*b* of the island-shaped portion 61 and an inner surface of the side wall 62*a* respectively, and these concave portions 64 and 65 allow elastic deformation of respective second contact portions 74 of the terminals 70. Here, a slit 67 is formed in a portion on which the coupling portion 75 of each terminal 70 is positioned on a bottom plate portion 66, positioned on the bottom surface of the accommodating concave portion 63, of the housing 60 and the coupling portion 75 is positioned in the slit 67, as illustrated in FIG. 4. This configuration allows elastic deformation of the coupling portion 75 with the second contact portion 74.

Figures 7A, 7B, 7C, 7D, 7E:
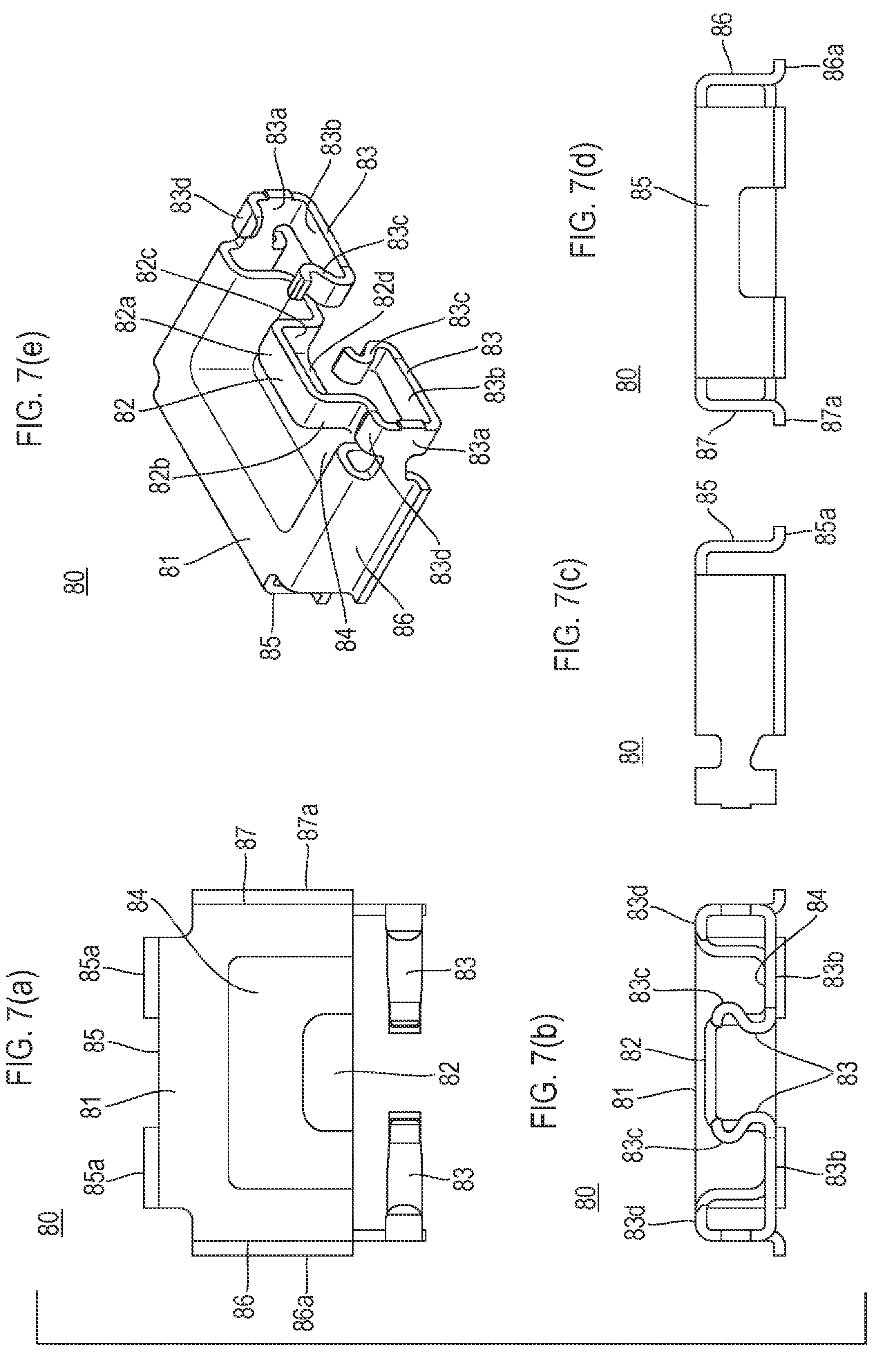
FIG. 7(*a*) is a plan view illustrating a reinforcing bracket of FIG. 3, FIG. 7(*b*) is an elevational view of the same, FIG. 7(*c*) is a right side view of the same, FIG. 7(*d*) is a rear view of the same, and FIG. 7(*e*) is a perspective view of the same.

The reinforcing brackets 80 are incorporated in both respective end portions in the longitudinal direction of the housing 60. FIG. 7 illustrates details of the reinforcing bracket 80. The configuration of the reinforcing bracket 80 will be described below with reference to FIG. 7.

The reinforcing bracket 80 includes a guide portion 81, a protection portion 82, and two spring strips 83. The guide portion 81 has an angular U shape in plan view and the protection portion 82 is positioned in the inside of the angular U shape of the guide portion 81 having the angular U shape in plan view, as illustrated in FIG. 7(*a*). The guide portion 81 and the protection portion 82 are both formed by drawing in this example. That is, the guide portion 81 and the protection portion 82 are formed by double drawing of sheet metal. Accordingly, there is sheet metal between the guide portion 81 and the protection portion 82 without any gap, and this portion is called a bottom plate portion 84 in this example.

The guide portion 81 protrudes upward from the bottom plate portion 84 and each of the three sides forming the angular U shape has an upside-down U shape in cross section. Lower ends of leg portions 85 to 87 on outer sides of the upside-down U shape on the three sides of the angular U shape are connection portions 85*a* to 87*a* each of which is to be connected with a board by soldering. The connection portions 85*a* to 87*a* are positioned slightly lower than the bottom plate portion 84 and have shapes bent outward in parallel to the bottom plate portion 84. Here, the lower half portion of the leg portion 85 is divided into two as illustrated in FIG. 7(*d*).

The protection portion 82 protrudes upward from the bottom plate portion 84 at an opening portion of the angular U shape formed by the guide portion 81. The protection portion 82 is composed of an upper plate portion 82*a*, a pair of side plate portions 82*b* and 82*c*, and a rear surface plate portion 82*d* that are continued without any gap. Thus, the protection portion 82 has a box-like shape whose front surface and lower surface are opened, as illustrated in FIG. 7(*e*).

The two spring strips 83 are formed in a manner to be extended from respective leg portions 86 and 87 of the guide portion 81. Each of the spring strips 83 is composed of a base portion 83*a*, an elongated portion 83*b*, and a contact portion 83*c*. The base portions 83*a* of the two spring strips 83 are extended forward from respective leg portions 86 and 87. The elongated portions 83*b* are bent from the base portions 83*a* and elongated in mutually approaching directions. The contact portions 83*c* are raised from respective ends of the elongated portions 83*b* so as to be opposed to each other. The elongated portions 83*b* are positioned on the same plane as the bottom plate portion 84. The contact portion 83*c* of the spring strip 83 that is extended and formed from the leg portion 86 has an S shape when viewed from the front as illustrated in FIG. 7(*b*), while the contact portion 83*c* of the spring strip 83 that is extended and formed from the leg portion 87 has an inverted S shape when viewed from the front as illustrated in FIG. 7(*b*). On an opposite side (upper side) of the side, from which the elongated portion 83*b* is bent and elongated, in the base portion 83*a*, an extended strip 83*d* is formed. The extended strip 83*d* is positioned on an extension of the upper surface portion of the guide portion 81 and has the same shape as the upper surface portion of the guide portion 81.

Figures 5A, 5B:
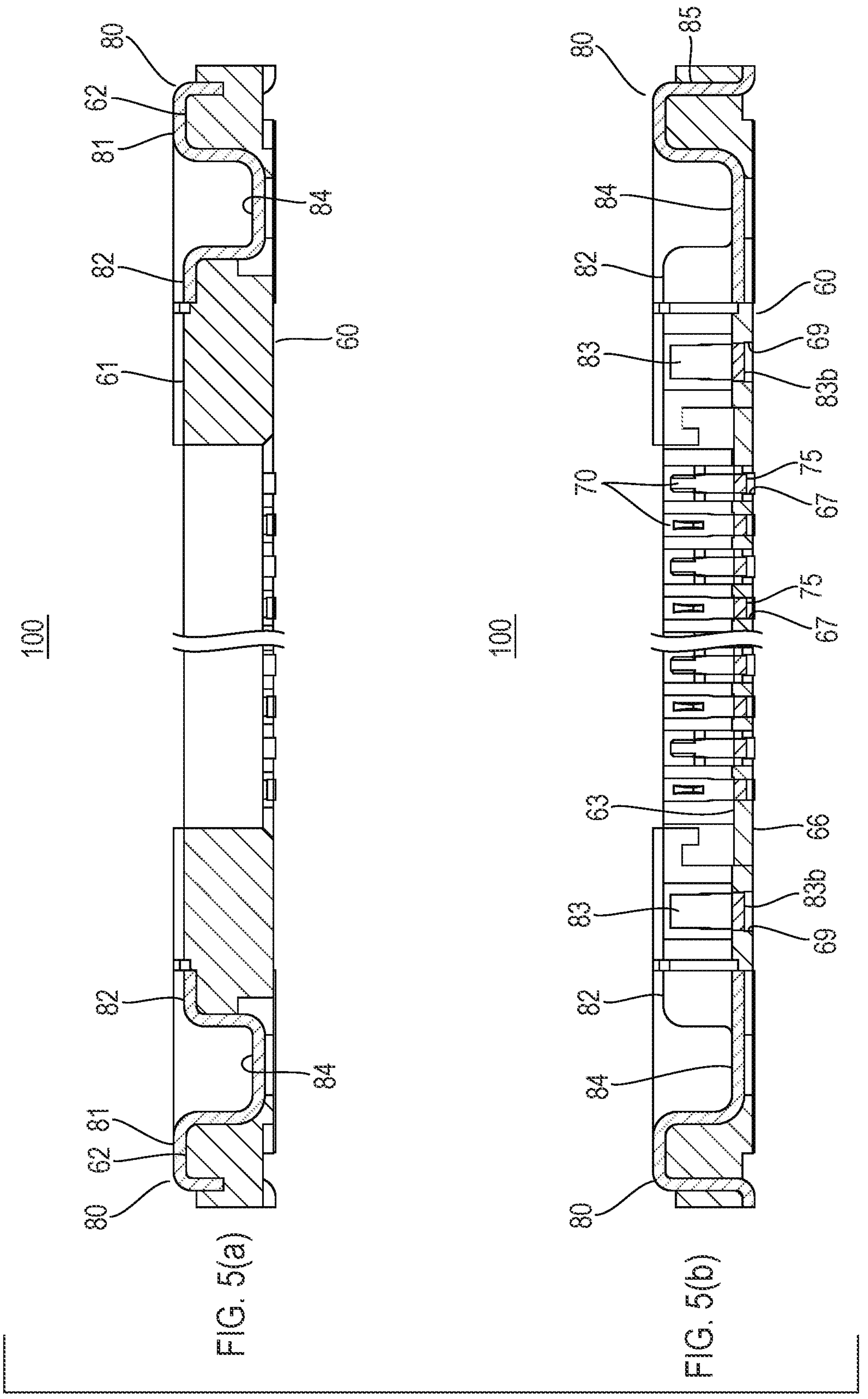
FIG. 5(*a*) is a sectional view taken along an A-A line of FIG. 4.

The reinforcing brackets 80 having the above-described shape are incorporated in both respective end portions in the longitudinal direction of the housing 60. Accordingly, the end portions of the island-shaped portion 61 of the housing 60 are covered by the protection portions 82 and the end portions of the peripheral wall 62 are covered by the guide portions 81, as illustrated in FIG. 5. The guide portion 81 having the angular U shape is positioned along the three sides of the peripheral wall 62. In other words, the reinforcing bracket 80 positioned on the end wall 62*c* side of the housing 60 covers the end wall 62*c* and the end portions of the side walls 62*a* and 62*b*, and the reinforcing bracket 80 positioned on the end wall 62*d* side covers the end wall 62*d* and the end portions of the side walls 62*a* and 62*b*. In the accommodating concave portion 63 of the housing 60 which is positioned between the guide portion 81 and the protection portion 82, the bottom plate portion 84 is located in a fitted state.

The two spring strips 83 forming cantilever shapes are positioned in a manner such that the elongated portions 83*b* pass through (cross) the accommodating concave portion 63 of the housing 60 to reach the island-shaped portion 61, pinching the island-shaped portion 61. The spring strips 83 are positioned on inner sides compared to the protection portions 82, that is, on the side closer to the terminals 70 in the longitudinal direction of the housing 60. On respective side surfaces 61*a* and 61*b* of the island-shaped portion 61, the concave portions 68 that allow elastic deformation of the contact portions 83*c* of the spring strips 83, which are brought into contact with a mating connector and elastically deform, are formed as illustrated in FIG. 6(*c*). Here, a slit 69 is formed in a portion, on which the elongated portion 83*b* of the spring strip 83 is positioned, on the bottom plate portion 66 of the housing 60 and the elongated portion 83*b* is positioned in the slit 69. This configuration allows elastic deformation of the elongated portion 83*b* with the contact portion 83*c*.

Figure 8:
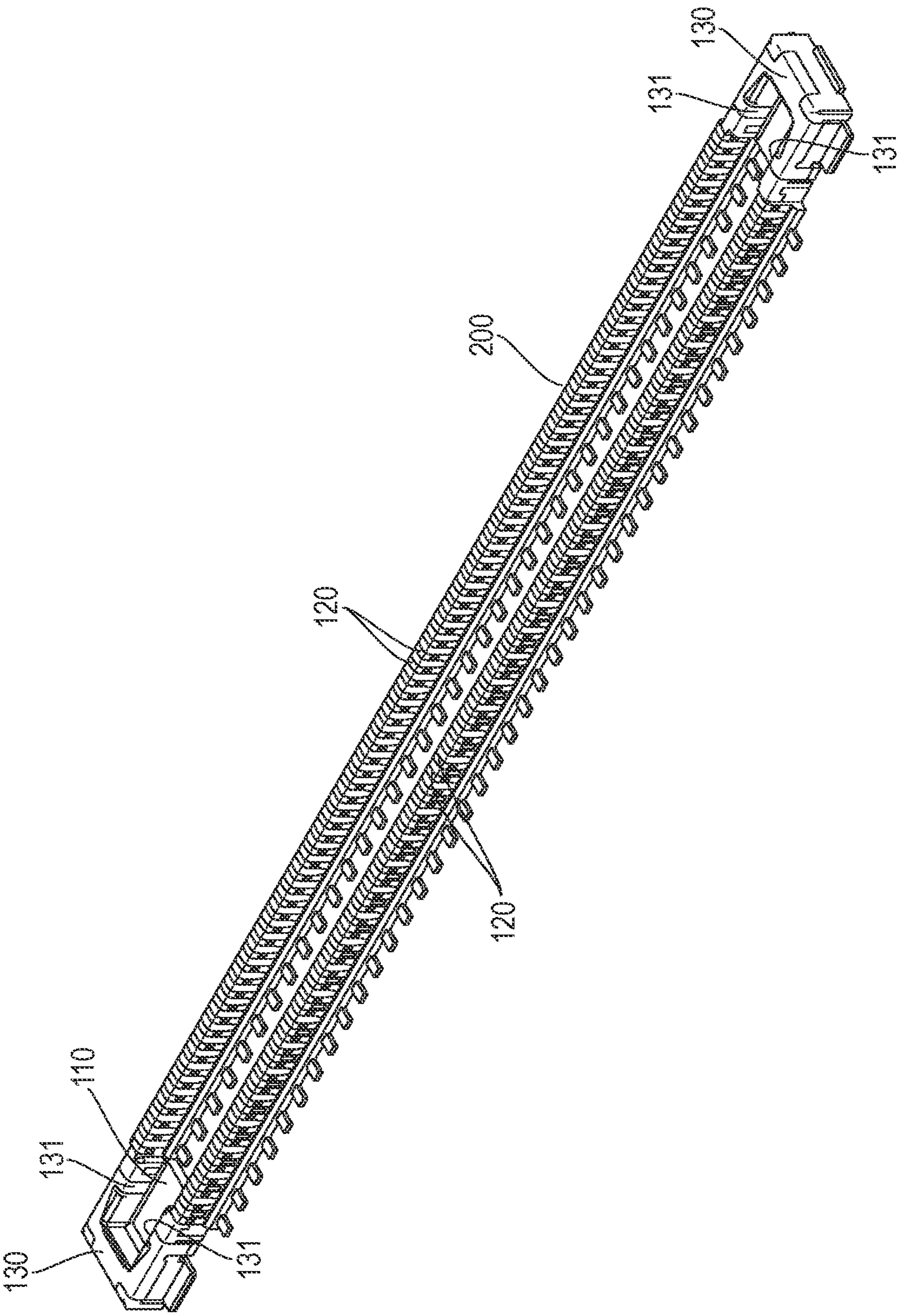
FIG. 8 is a perspective view illustrating a mating connector to be fitted to the connector illustrated in FIG. 3.

FIG. 8 illustrates a mating connector 200 that is to be fitted to the connector 100, described above, so as to constitute a board-to-board connector. In FIG. 8, 110 denotes a housing made of resin and 120 denotes a terminal. Further, 130 denotes a reinforcing bracket.

The housing 110 has an elongated rectangular frame shape and a large number of terminals 120 are arranged and held on a pair of long side portions of the housing 110. The respective reinforcing brackets 130 are arranged on both end portions in a longitudinal direction of the housing 110, and the terminals 120 and the reinforcing brackets 130 are incorporated in the housing 110 by insert molding in this example.

Figure 9:
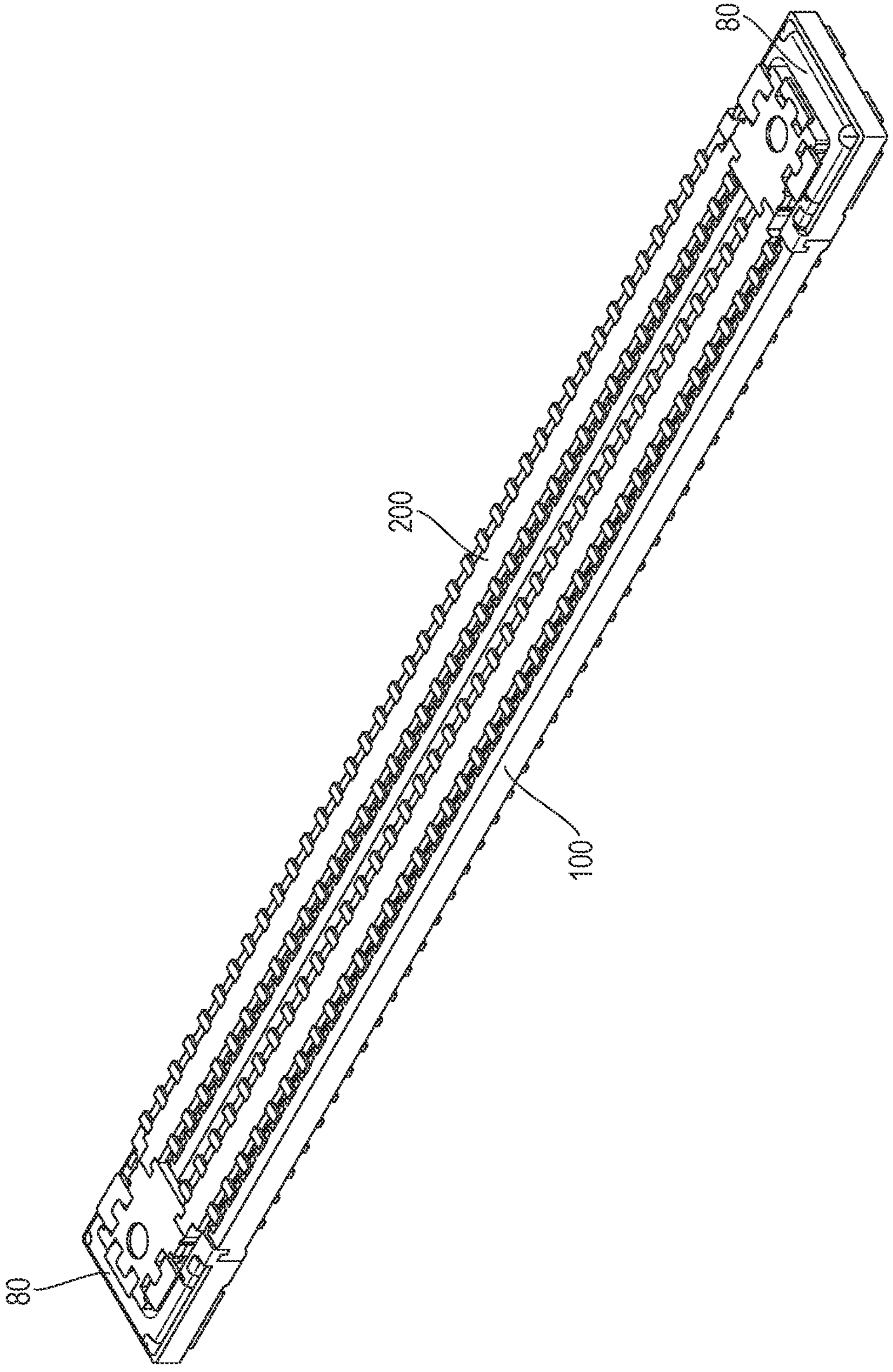
FIG. 9 is a perspective view illustrating a fitting state between the connector illustrated in FIG. 3 and the mating connector illustrated in FIG. 8.

FIG. 9 illustrates a state in which the connector 100 and the mating connector 200 are fitted to each other without illustrating respective boards on which the connector 100 and the mating connector 200 are mounted. The mating connector 200 is configured to be fitted into the accommodating concave portion 63 of the connector 100 so as to be connected with the connector 100.

Figure 10:
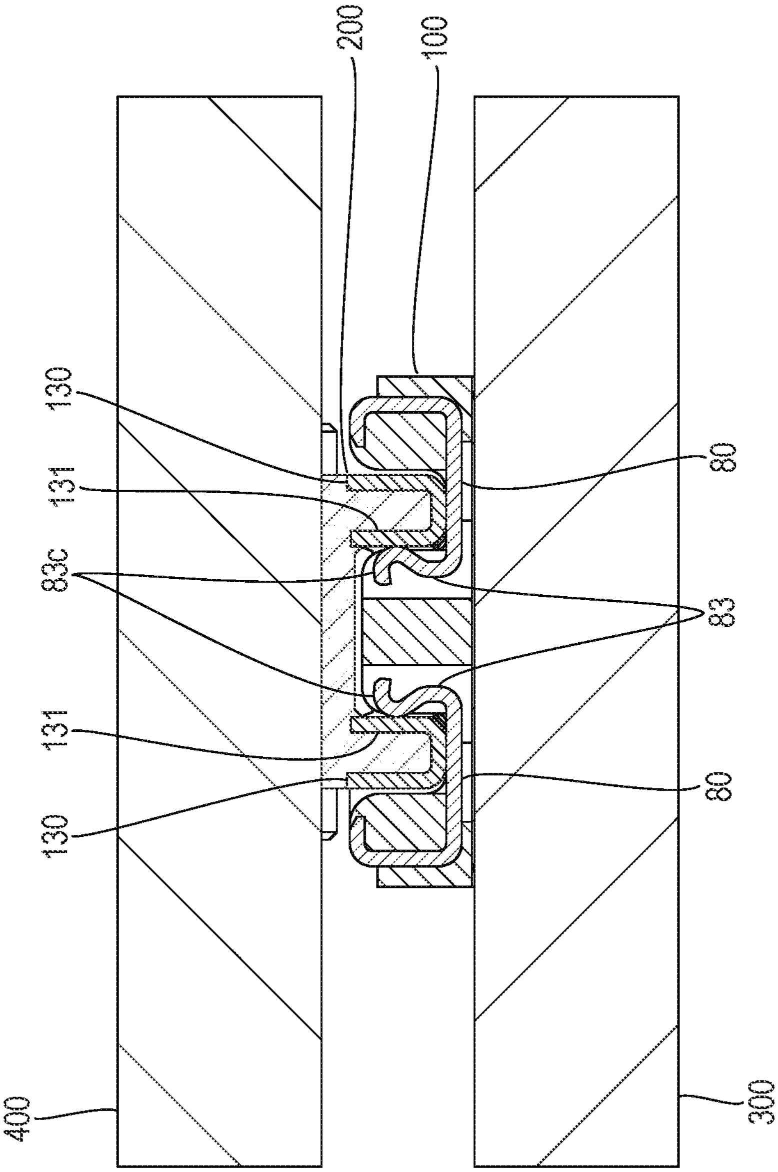
FIG. 10 is an enlarged sectional view illustrating a state in which the connector illustrated in FIG. 3 and the mating connector illustrated in FIG. 8 are mounted on respective boards and are fitted to each other.

FIG. 10 illustrates a cross section of a portion on which the spring strips 83 of the reinforcing brackets 80 of the connector 100 are positioned in a state in which the connector 100 and the mating connector 200 are mutually fitted and connected. FIG. 10 also illustrates boards 300 and 400 on which the connector 100 and the mating connector 200 are mounted respectively.

As illustrated in FIG. 10, the contact portions 83*c* of the two spring strips 83 included in the reinforcing brackets 80 of the connector 100 are brought into contact with contact portions 131 included in the reinforcing brackets 130 of the mating connector 200.

The configuration of the connector 100 has been described as an example of the connector of the present invention, and the configuration of the mating connector 200 and the fitting state with the mating connector 200 have also been described above. According to the configuration of the connector 100, following advantageous effects can be obtained.

(1) The contact portion 83*c*, which is to be in contact with the mating connector 200, of the spring strip 83 included in the reinforcing bracket 80 is positioned to the island-shaped portion 61 of the housing 60, in this example, and the concave portion 68 that is formed on the island-shaped portion 61 allows elastic deformation of the contact portion 83*c*. Unlike the related art in which the concave portion 27 allowing elastic deformation of the elastic strip 42 of the reinforcing member 40 is formed in the first opposing wall portion 24, in this example, a concave portion allowing deformation of the spring strip 83 does not need to be formed on the peripheral wall 62 forming an outer shape of the housing 60, that is, the concave portion that reduces the thickness of the peripheral wall 62 is not necessary. Accordingly, strength of the housing 60 is not degraded. Here, even though the concave portion 68 is formed in the island-shaped portion 61 of the housing 60, the strength of the housing 60 is not degraded.

Accordingly, even though, for example, the width of the spring strip 83 included in the reinforcing bracket 80 is increased so as to use the spring strip 83 as a power supply terminal, the strength of the housing 60 is not degraded because a concave portion allowing elastic deformation of the spring strip 83 is not in the peripheral wall 62.

(2) The reinforcing bracket 80 includes the bottom plate portion 84 that is formed between the protection portion 82, which covers the end portion of the island-shaped portion 61 of the housing 60, and the guide portion 81, which covers the end portion of the peripheral wall 62, without any gap. Thus, there are integrated metals having a significantly large area on both respective end portions of the housing 60 so as to protect and reinforce the housing 60, and the strength of the reinforcing brackets 80 themselves is enhanced. Accordingly, a connector can be obtained that is not damaged by external force and the like received during, for example, mating and unmating with a mating connector and thus has excellent strength.

The foregoing description of the embodiment of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A connector comprising:

a housing that is made of resin;

two reinforcing brackets that are incorporated in both respective end portions in a longitudinal direction of the housing; and terminals that are arranged on and held by the housing between the two reinforcing brackets, wherein the housing includes an island-shaped portion that extends in the longitudinal direction, a peripheral wall that surrounds the island-shaped portion, and an accommodating concave portion that is formed between the peripheral wall and the island-shaped portion so as to accommodate a fitting portion of a mating connector, the terminals are positioned along a side surface in the longitudinal direction of the island-shaped portion, in the accommodating concave portion, each of the reinforcing brackets includes a protection portion covering an end portion of the island-shaped portion, a guide portion covering an end portion of the peripheral wall, and a spring strip, the spring strip is formed in a cantilever shape that is extended from the guide portion to pass through the accommodating concave portion and reach the island-shaped portion, and the spring strip is positioned on an inner side compared to the protection portion in the longitudinal direction of the housing, and a concave portion that allows elastic deformation of the spring strip, the spring strip being brought into contact with the mating connector and elastically deforming, is formed on the side surface of the island-shaped portion.

2. The connector according to claim 1, wherein the reinforcing bracket includes two pieces of the spring strips and the two spring strips are positioned in a manner to pinch the island-shaped portion.

3. The connector according to claim 1, wherein the peripheral wall has a rectangular frame shape, the guide portion and the protection portion are both formed by drawing and the guide portion is positioned along three sides of the peripheral wall, and the reinforcing bracket covers the accommodating concave portion, the accommodating concave portion being positioned between the guide portion and the protection portion, without any gap.

4. The connector according to claim 2, wherein the peripheral wall has a rectangular frame shape, the guide portion and the protection portion are both formed by drawing and the guide portion is positioned along three sides of the peripheral wall, and the reinforcing bracket covers the accommodating concave portion, the accommodating concave portion being positioned between the guide portion and the protection portion, without any gap.

* * * * *